US012451059B1

(12) United States Patent
Hashimoto

(10) Patent No.: US 12,451,059 B1
(45) Date of Patent: Oct. 21, 2025

(54) ELECTRONIC DEVICE

(71) Applicant: Innolux Corporation, Miaoli County (TW)

(72) Inventor: Kazuyuki Hashimoto, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/926,338

(22) Filed: Oct. 25, 2024

Related U.S. Application Data

(60) Provisional application No. 63/661,898, filed on Jun. 20, 2024.

(51) Int. Cl.
*G09G 3/32* (2016.01)
*H01Q 1/22* (2006.01)
*H01Q 3/26* (2006.01)

(52) U.S. Cl.
CPC ................ *G09G 3/32* (2013.01); *H01Q 1/22* (2013.01); *H01Q 3/26* (2013.01); *G09G 2300/0852* (2013.01); *G09G 2310/0291* (2013.01); *G09G 2310/08* (2013.01)

(58) Field of Classification Search
None
See application file for complete search history.

(56) References Cited

U.S. PATENT DOCUMENTS

2023/0077359 A1* 3/2023 Hashimoto ............ H03F 1/301 345/55

FOREIGN PATENT DOCUMENTS

CN 101174043 4/2011

* cited by examiner

*Primary Examiner* — Christopher J Kohlman
(74) *Attorney, Agent, or Firm* — JCIPRNET

(57) ABSTRACT

An electronic device of the disclosure includes a plurality of electronic units. Each of the plurality of electronic units includes a pixel circuit and a plurality of tunable circuits. The plurality of tunable circuits is coupled to the pixel circuit. The pixel circuit includes at least one scan transistor, a plurality of de-multiplexer transistors, and a plurality of storage capacitors. The plurality of de-multiplexer transistors is coupled to the at least one scan transistor. The plurality of storage capacitors is coupled to a data line through the at least one scan transistor and the plurality of de-multiplexer transistors.

20 Claims, 13 Drawing Sheets

ELECTRONIC DEVICE

CROSS-REFERENCE TO RELATED APPLICATION

This application claims the priority benefit of U.S. provisional application Ser. No. 63/661,898, filed on Jun. 20, 2024. The entirety of the above-mentioned patent application is hereby incorporated by reference herein and made a part of this specification.

BACKGROUND

Technical Field

The disclosure relates a device; particularly, the disclosure relates to an electronic device.

Description of Related Art

For a conventional electronic device having a plurality of tunable circuits, when the plurality of tunable circuits are formed on a non-rectangular substrate, it is easy to make wiring and/or transistor layout difficulties, and the tunable circuit layout space in some substrate areas to become crowded and a driving of the plurality of tunable circuits to become inefficient when the plurality of tunable circuits has different tunable characteristics.

SUMMARY

The electronic device of the disclosure includes a plurality of electronic units. Each of the plurality of electronic units includes a pixel circuit and a plurality of tunable circuits. The plurality of tunable circuits is coupled to the pixel circuit. The pixel circuit includes at least one scan transistor, a plurality of de-multiplexer transistors, and a plurality of storage capacitors. The plurality of de-multiplexer transistors is coupled to the at least one scan transistor. The plurality of storage capacitors is coupled to a data line through the at least one scan transistor and the plurality of de-multiplexer transistors.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
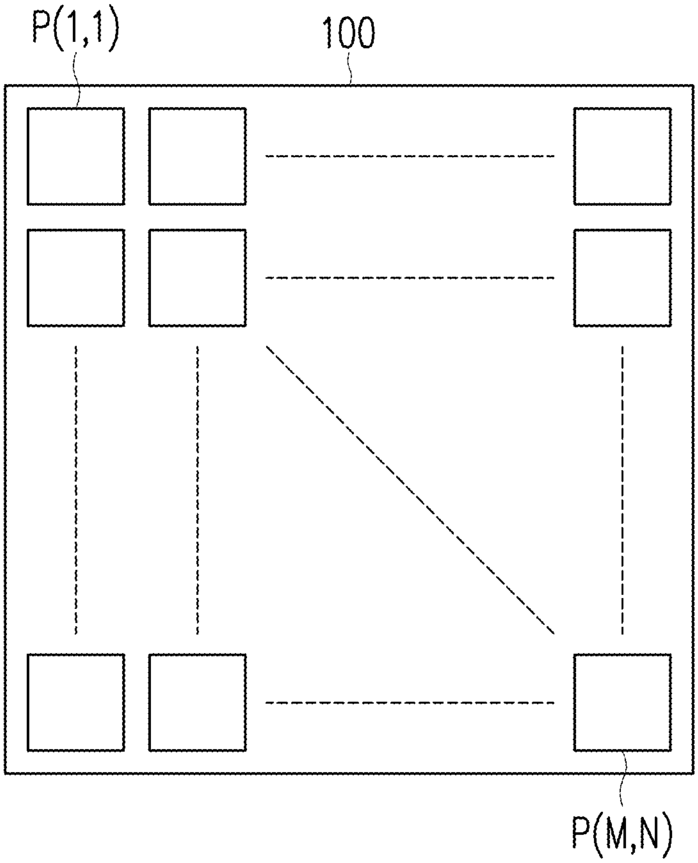
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as “comprise” and “include” are open-ended terms, and should be explained as “including but not limited to . . . ”.

The term “coupling (or connection)” used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms “first”, “second”, and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

FIG. 1 is a schematic diagram of an electronic device according to an embodiment of the disclosure. Referring to FIG. 1, the electronic device 100 includes a plurality of tunable circuits P(1,1) to P(M,N), where M and N are positive integers. In the embodiment of the disclosure, the tunable circuits P(1,1) to P(M,N) may be disposed on a panel substrate, and the panel substrate may be circular, rectangular or any shape etc. The tunable circuits P(1,1) to P(M,N)

may be arranged in an array or non-array manner, and are not limited to those shown in the FIG. 1. In one embodiment of the disclosure, the electronic device 100 may be a beam-steerable bidirectional antenna device, and the tunable circuits P(1,1) to P(M,N) may form a plurality of transmitter circuits and a plurality of receiver circuits of the beam-steerable bidirectional antenna device.

In the embodiment of the disclosure, the electronic device 100 may further include a plurality of data lines and a plurality of scan lines for driving the tunable circuits P(1,1) to P(M,N). The electronic device 100 may further include a plurality of electronic units (not shown in FIG. 1), and each of the electronic units may include multiple tunable circuits, such as two tunable circuits or four tunable circuits. Moreover, the each of the electronic units may further include one pixel circuit for an interlaced scanning of multiple tunable circuits in a multiplexing manner.

Figure 2:
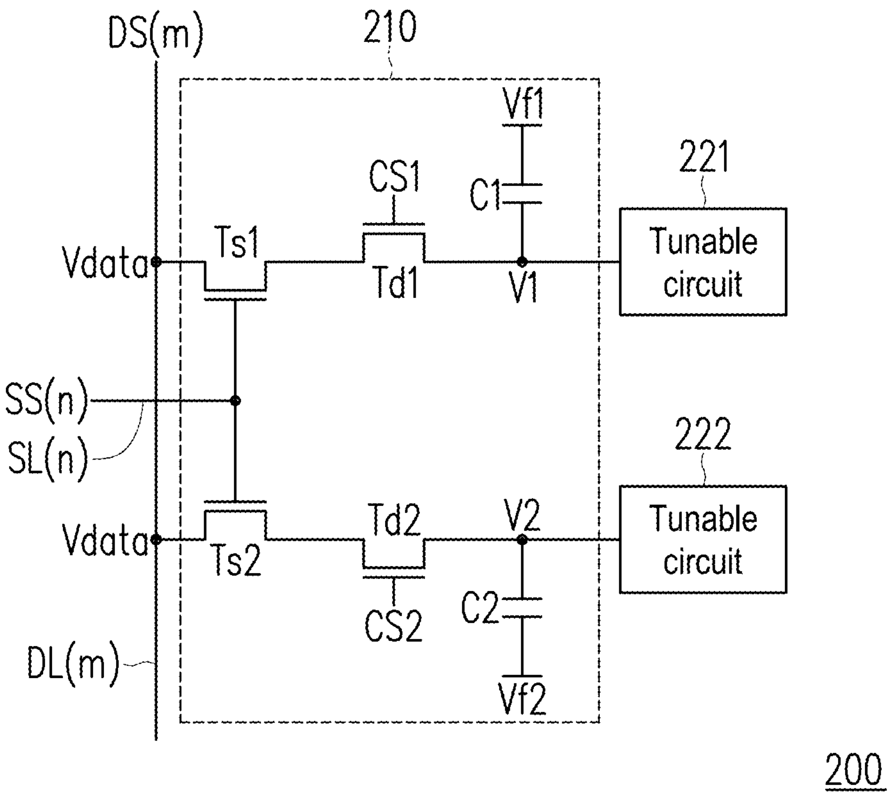
FIG. 2 is a schematic diagram of an electronic unit according to an embodiment of the disclosure.

FIG. 2 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 2, each of the electronic units of the above embodiment of FIG. 1 may be implemented as the electronic unit 200 of FIG. 2, and each two adjacent tunable circuits may be implemented as two tunable circuits 221 and 222 of FIG. 2. In the embodiment of the disclosure, the electronic unit 200 includes a pixel circuit 210, and the two tunable circuits 221 and 222. The pixel circuit 210 is coupled to the tunable circuits 221 and 222. The pixel circuit 210 includes two scan transistors Ts1 and Ts2, two de-multiplexer transistors Td1 and Td2, and two storage capacitors C1 and C2. In the embodiment of the disclosure, the scan transistors Ts1, Ts2 and the de-multiplexer transistors Td1, Td2 are N-type transistors, but the disclosure is not limited thereto. The tunable circuits 221 and 222 may have different tunable characteristics, such as different resonant frequency tunable ranges. In the embodiment of the disclosure, each of the tunable circuits 221 and 222 includes a tunable component. In one embodiment of the disclosure, the tunable component may be a voltage-controlled and capacitance tunable component, such as a varactor diode. Moreover, in one embodiment of disclosure, the tunable circuit 221 and 222 may form a transmitter circuit and a receiver circuit which have different resonant frequency tunable ranges in beam-steerable bidirectional antenna, operate independently in full-duplex operation, and include varactor diodes as the voltage-controlled capacitance tunable component to tune resonant frequency of the transmitter and the receiver circuits.

In the embodiment of the disclosure, a first terminal of the scan transistor Ts1 is coupled to a data line DL(m), where m is between 1 to M. A second terminal of the scan transistor Ts1 is coupled to a first terminal of the de-multiplexer transistor Td1. A control terminal of the scan transistor Ts1 is coupled to a scan line SL(n), where n is between 1 to N/2. A second terminal of the de-multiplexer transistor Td1 is coupled to a first terminal of the storage capacitor C1 and the tunable circuit 221. A control terminal of the de-multiplexer transistor Td1 receives a control signal CS1. A second terminal of the storage capacitor C1 is coupled to a constant voltage source Vf1.

In the embodiment of the disclosure, a first terminal of the scan transistor Ts2 is coupled to the same data line DL(m). A second terminal of the scan transistor Ts2 is coupled to a first terminal of the de-multiplexer transistor Td2. A control terminal of the scan transistor Ts2 is coupled to the same scan line SL(n). A second terminal of the de-multiplexer transistor Td2 is coupled to a first terminal of the storage capacitor C2 and the tunable circuit 222. A control terminal of the de-multiplexer transistor Td2 receives a control signal CS2. A second terminal of the storage capacitor C2 is coupled to a constant voltage source Vf2.

In the embodiment of the disclosure, the control terminals of the scan transistors Ts1 and Ts2 receive same scan signal SS(n) from the scan line SL(n), so that the scan transistors Ts1 and Ts2 may be turned-on at the same time to receive same data signal DS(m) with a data voltage Vdata from the data line DL(m). The de-multiplexer transistors Td1 and Td2 receive different control signals CS1 and CS2, so that the de-multiplexer transistors Td1 and Td2 may be turned-on at the different times to respectively provide the data signal DS(m) with the corresponding data voltage Vdata to the storage capacitors C1 and C2. That is, each of the storage capacitors C1 and C2 may receive a corresponding data voltage from the data line DL(m). Thus, the pixel circuit 210 may provide a driving signal with driving voltage V1 to drive the tunable circuit 221 according to the storage capacitor C1, and may provide a driving signal with driving voltage V2 to drive the tunable circuit 222 according to the storage capacitor C2. In other words, since the each two adjacent tunable circuit of the tunable circuits P(1,1) to P(M,N) may share the same scan line, the number of scan lines of the electronic device 100 may be effectively reduced.

Figure 3:
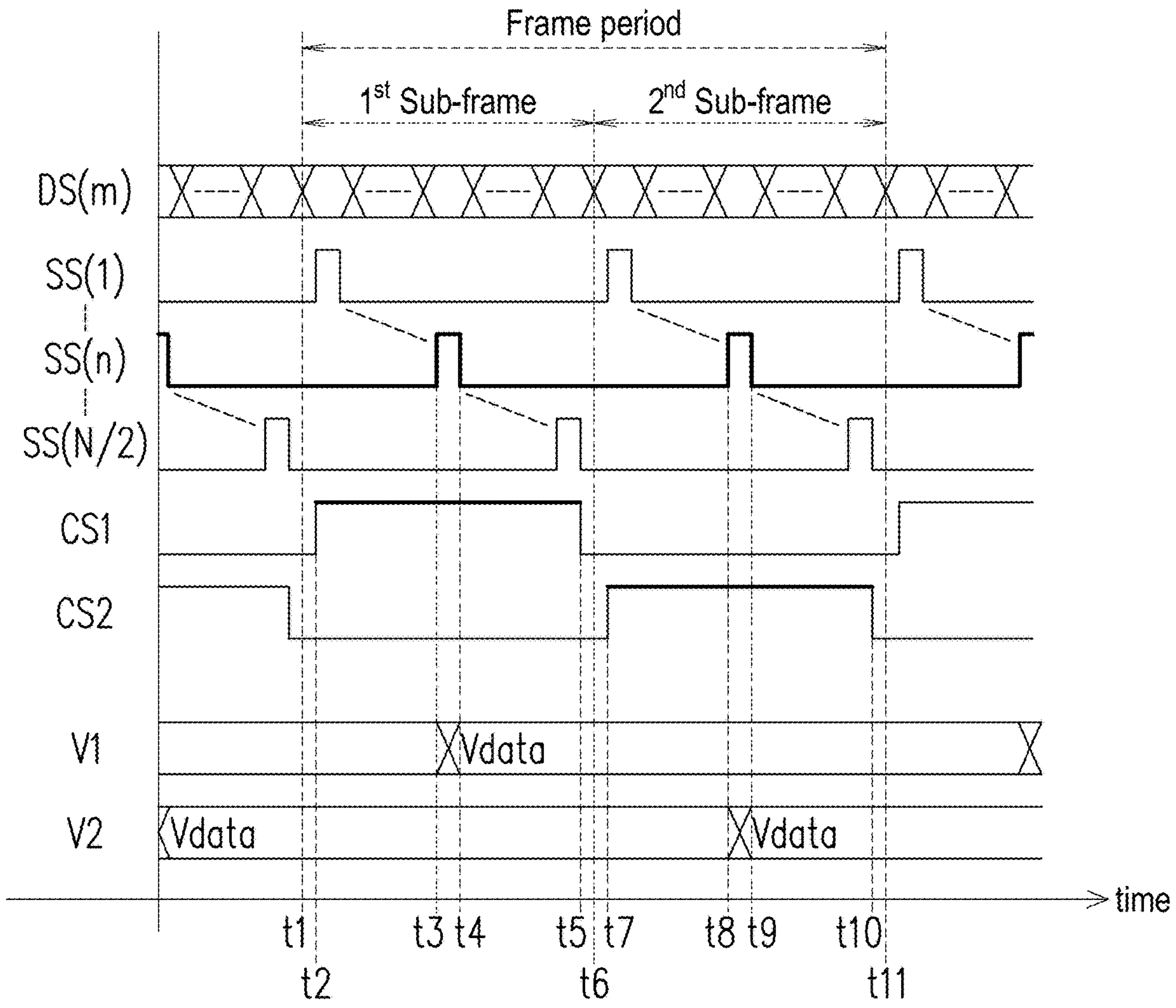
FIG. 3 is a timing diagram of relevant signals according to the embodiment of the FIG. 2.

FIG. 3 is a timing diagram of relevant signals according to the embodiment of the FIG. 2. The following embodiment assumes that the electronic unit 200 may be a (m,n)-th electronic unit, and the N/2 scan lines of the electronic device may provide the scan signals SS(1) to SS(N/2) respectively. As shown in FIG. 3, the electronic unit 200 may receive the data signal DS(m), the scan signal SS(n), the control signals CS1 and CS2. In the embodiment of the disclosure, the signal waveforms of the control signals CS1 and CS2 are complementary. Referring to FIG. 2 and FIG. 3, during one frame period from time t1 to time t11, the pixel circuit 210 may split data writing period of the tunable circuits 221 and 222 into a first sub-frame period from time t1 to time t6 and a second sub-frame period from time t6 to time t11. Specifically, during a period from time t2 to time t5, the control signal CS1 is changed from a low voltage level to a high voltage level, and the control signal CS2 is maintained at the low voltage level. Thus, during the period from time t2 to time t5, the de-multiplexer transistor Td1 is turned-on, and the de-multiplexer transistor Td2 is turned-off. During a period from time t3 to time t4, the scan signal SS(n) is changed from the low voltage level to the high voltage level, so that the scan transistors Ts1 and Ts2 are turned-on. Thus, during the period from time t3 to time t4, the de-multiplexer transistor Td1 may provide the data signal DS(m) with the corresponding data voltage Vdata to the storage capacitor C1, so that the pixel circuit 210 may provide the driving signal with driving voltage V1 to drive the tunable circuit 221 according to the storage capacitor C1. Furthermore, during the period from time t3 to time t4, the de-multiplexer transistor Td2 is turned-off, and does not provide the data signal DS(m) to the storage capacitor C2. Thus, the pixel circuit 210 may continue to provide the driving signal to the tunable circuit 222 corresponding to driving voltage V2 stored in the storage capacitor C2.

Moreover, during a period from time t7 to time t10, the control signal CS2 is changed from the low voltage level to the high voltage level, and the control signal CS1 is maintained at the low voltage level. Thus, during the period from time t7 to time t10, the de-multiplexer transistor Td2 is turned-on, and the de-multiplexer transistor Td1 is turned-off. During a period from time t8 to time t9, the scan signal SS(n) is changed from the low voltage level to the high voltage level, so that the scan transistors Ts1 and Ts2 are turned-on. Thus, during the period from time t8 to time t9, the de-multiplexer transistor Td2 may provide the data signal DS(m) with the corresponding data voltage Vdata to the storage capacitor C2, so that the pixel circuit 210 may provide the driving signal with driving voltage V2 to drive the tunable circuit 222 according to the storage capacitor C2. Furthermore, during the period from time t8 to time t9, the de-multiplexer transistor Td1 is turned-off, and does not provide the data signal DS(m) to the storage capacitor C1. Thus, the pixel circuit 210 may continue to provide the driving signal to the tunable circuit 221 corresponding to driving voltage V1 stored in the storage capacitor C1.

In the embodiment of the disclosure, the turn-on periods of the de-multiplexer transistors Td1 and Td2 are non-overlapping. Therefore, the during one frame period, the pixel circuit 210 may split data writing period of the tunable circuits 221 and 222 into two sub-frame periods of one frame period to realize an efficient driving of the tunable circuits 221 and 222 with an interlaced scanning when the tunable circuits 221 and 222 operate independently. Moreover, for the transmitter circuits and the receiver circuits of the beam-steerable bidirectional antenna device, data writing period of each transmitter circuit and receiver circuit is split into two sub-frame periods by the pixel circuit 210 like the tunable circuits 221 and 222 with the interlaced scanning, which contribute a fast beam-steering by separate data writing of the transmitter circuits and the receiver circuits in each sub-frame period for a full-duplex operation of the beam-steerable bidirectional antenna device.

Figure 4:
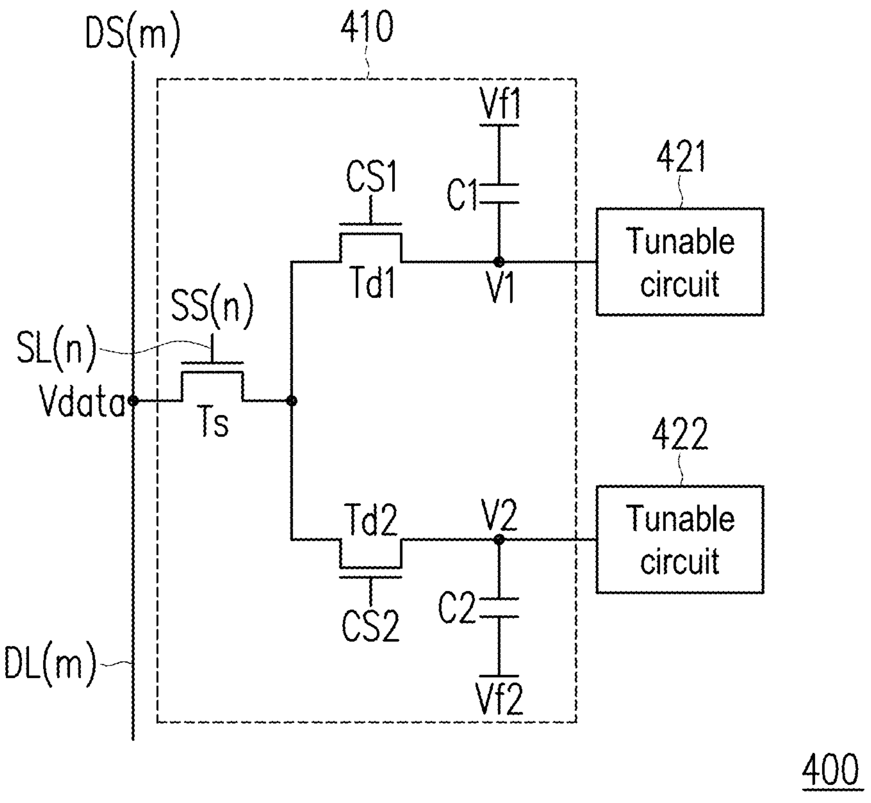
FIG. 4 is a schematic diagram of an electronic unit according to an embodiment of the disclosure.

FIG. 4 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 4, each of the electronic units of the above embodiment of FIG. 1 may be implemented as the electronic unit 400 of FIG. 4, and each two adjacent tunable circuits may be implemented as two tunable circuits 421 and 422 of FIG. 4. In the embodiment of the disclosure, the electronic unit 400 includes a pixel circuit 410, and the two tunable circuits 421 and 422. The pixel circuit 410 is coupled to the tunable circuits 421 and 422. The pixel circuit 410 includes one scan transistor Ts, two de-multiplexer transistors Td1 and Td2, and two storage capacitors C1 and C2.

In the embodiment of the disclosure, a first terminal of the scan transistor Ts is coupled to a data line DL(m), where m is between 1 to M. A second terminal of the scan transistor Ts is coupled to a first terminal of the de-multiplexer transistor Td1 and a first terminal of the de-multiplexer transistor Td2. A control terminal of the scan transistor Ts is coupled to a scan line SL(n), where n is between 1 to N/2. A second terminal of the de-multiplexer transistor Td1 is coupled to a first terminal of the storage capacitor C1 and the tunable circuit 421. A control terminal of the de-multiplexer transistor Td1 receives a control signal CS1. A second terminal of the storage capacitor C1 is coupled to a constant voltage source Vf1. A second terminal of the de-multiplexer transistor Td2 is coupled to a first terminal of the storage capacitor C2 and the tunable circuit 422. A control terminal of the de-multiplexer transistor Td2 receives a control signal CS2. A second terminal of the storage capacitor C2 is coupled to a constant voltage source Vf2.

In the embodiment of the disclosure, the control terminal of the scan transistors Ts receives a scan signal SS(n) from the scan line SL(n) to receive a data signal DS(m) with a data voltage Vdata from the data line DL(m). The de-multiplexer transistors Td1 and Td2 receive different control signals CS1 and CS2, so that the de-multiplexer transistors Td1 and Td2 may be turned-on at the different times to respectively provide the data signal DS(m) with the corresponding data voltage Vdata to the storage capacitors C1 and C2. Thus, the pixel circuit 410 may provide a driving signal with driving voltage V1 to drive the tunable circuit 421 according to the storage capacitor C1, and provides a driving signal with driving voltage V2 to drive the tunable circuit 422 according to the storage capacitor C2. In other words, since the each two adjacent tunable circuit of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

In the embodiment of the disclosure, the relevant signals of FIG. 3 may also be applied to the electronic unit 400, therefore the pixel circuit 410 may also split data writing period of the tunable circuits 421 and 422 into two sub-frame periods of one frame period to realize an efficient driving of the tunable circuits 421 and 422 with an interlaced scanning when the tunable circuits 421 and 422 operate independently. Moreover, for the transmitter circuits and the receiver circuits of the beam-steerable bidirectional antenna device, data writing period of each transmitter circuit and receiver circuit is split into two sub-frame periods by the pixel circuit 410 like the tunable circuits 421 and 422 with the interlaced scanning, which contribute a fast beam-steering by separate data writing of the transmitter circuits and the receiver circuits in each sub-frame period for a full-duplex operation of the beam-steerable bidirectional antenna device.

Figure 5:
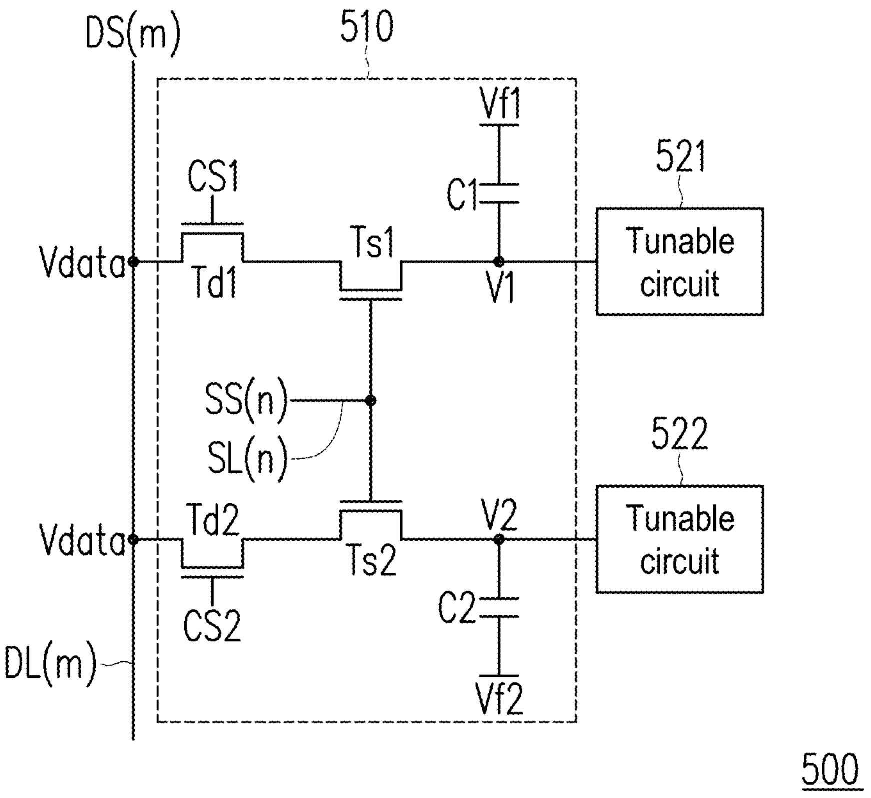
FIG. 5 is a schematic diagram of an electronic unit according to an embodiment of the disclosure.

FIG. 5 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 5, each of the electronic units of the above embodiment of FIG. 1 may be implemented as the electronic unit 500 of FIG. 5, and each two adjacent tunable circuits may be implemented as two tunable circuits 521 and 522 of FIG. 5. In the embodiment of the disclosure, the electronic unit 500 includes a pixel circuit 510, and the two tunable circuits 521 and 522. The pixel circuit 510 is coupled to the tunable circuits 521 and 522. The pixel circuit 510 includes two scan transistors Ts1 and Ts2, two de-multiplexer transistors Td1 and Td2, and two storage capacitors C1 and C2.

In the embodiment of the disclosure, a first terminal of the de-multiplexer transistor Td1 is coupled to a data line DL(m), where m is between 1 to M. A second terminal of the de-multiplexer transistor Td1 is coupled to a first terminal of the scan transistor Ts1. A control terminal of the de-multiplexer transistor Td1 receives a control signal CS1. A second terminal of the scan transistor Ts1 is coupled to a first terminal of the storage capacitor C1 and the tunable circuit 521. A control terminal of the scan transistor Ts1 is coupled to a scan line SL(n), where n is between 1 to N/2. A second terminal of the storage capacitor C1 is coupled to a constant voltage source Vf1.

In the embodiment of the disclosure, a first terminal of the de-multiplexer transistor Td2 is coupled to the same data line DL(m). A second terminal of the de-multiplexer transistor Td2 is coupled to a first terminal of the scan transistor Ts2. A control terminal of the de-multiplexer transistor Td2 receives a control signal CS2. A second terminal of the scan transistor Ts2 is coupled to a first terminal of the storage capacitor C2 and the tunable circuit 522. A control terminal of the scan transistor Ts2 is coupled to the same scan line SL(n). A second terminal of the storage capacitor C2 is coupled to a constant voltage source Vf2.

In the embodiment of the disclosure, the control terminals of the scan transistors Ts1 and Ts2 receive same scan signal SS(n) from the scan line SL(n). The de-multiplexer transistors Td1 and Td2 receive different control signals CS1 and CS2, so that the de-multiplexer transistors Td1 and Td2 may be turned-on at the different times to respectively provide the data signal DS(m) with the corresponding data voltage Vdata to the storage capacitors C1 and C2 through the scan transistors Ts1 and Ts2. That is, each of the storage capacitors C1 and C2 may receive a corresponding data voltage from the data line DL(m). Thus, the pixel circuit 510 may provide a driving signal with driving voltage V1 to drive the tunable circuit 521 according to the storage capacitor C1, and may provide a driving signal with driving voltage V2 to drive the tunable circuit 522 according to the storage capacitor C2. In other words, since the each two adjacent tunable circuit of the tunable circuits P(1,1) to P(M,N) may share the same scan line, the number of scan lines of the electronic device 100 may be effectively reduced.

In the embodiment of the disclosure, the relevant signals of FIG. 3 may also be applied to the electronic unit 500, therefore the pixel circuit 510 may also split data writing period of the tunable circuits 521 and 522 into two sub-frame periods of one frame period to realize an efficient driving of the tunable circuits 521 and 522 with an interlaced scanning when the tunable circuits 521 and 522 operate independently. Moreover, for the transmitter circuits and the receiver circuits of the beam-steerable bidirectional antenna device, data writing period of each transmitter circuit and receiver circuit is split into two sub-frame periods by the pixel circuit 510 like the tunable circuits 521 and 522 with the interlaced scanning, which contribute a fast beam-steering by separate data writing of the transmitter circuits and the receiver circuits in each sub-frame period for a full-duplex operation of the beam-steerable bidirectional antenna device.

Figure 6:
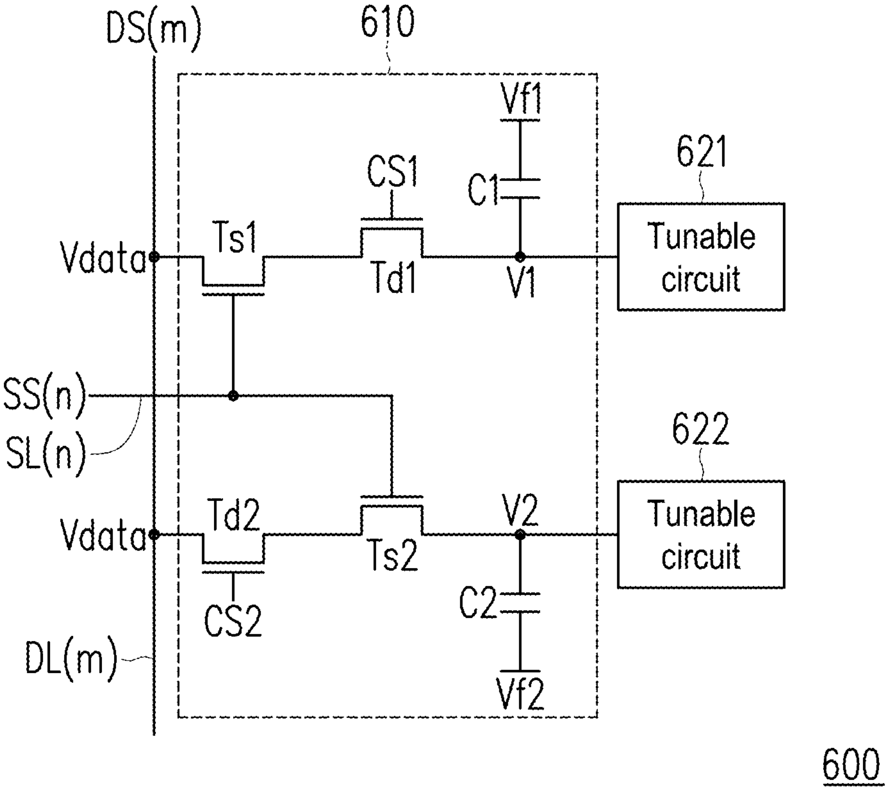
FIG. 6 is a schematic diagram of an electronic unit according to an embodiment of the disclosure.

FIG. 6 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 6, each of the electronic units of the above embodiment of FIG. 1 may be implemented as the electronic unit 600 of FIG. 6, and each two adjacent tunable circuits may be implemented as two tunable circuits 621 and 622 of FIG. 5. In the embodiment of the disclosure, the electronic unit 600 includes a pixel circuit 610, and the two tunable circuits 621 and 622. The pixel circuit 610 is coupled to the tunable circuits 621 and 622. The pixel circuit 610 includes two scan transistors Ts1 and Ts2, two de-multiplexer transistors Td1 and Td2, and two storage capacitors C1 and C2.

In the embodiment of the disclosure, a first terminal of the scan transistor Ts1 is coupled to a data line DL(m), where m is between 1 to M. A second terminal of the scan transistor Ts1 is coupled to a first terminal of the de-multiplexer transistor Td1. A control terminal of the scan transistor Ts1 is coupled to a scan line SL(n), where n is between 1 to N/2. A second terminal of the de-multiplexer transistor Td1 is coupled to a first terminal of the storage capacitor C1 and the tunable circuit 621. A control terminal of the de-multiplexer transistor Td1 receives a control signal CS1. A second terminal of the storage capacitor C1 is coupled to a constant voltage source Vf1.

In the embodiment of the disclosure, a first terminal of the de-multiplexer transistor Td2 is coupled to the same data line DL(m). A second terminal of the de-multiplexer transistor Td2 is coupled to a first terminal of the scan transistor Ts2. A control terminal of the de-multiplexer transistor Td2 receives a control signal CS2. A second terminal of the scan transistor Ts2 is coupled to a first terminal of the storage capacitor C2 and the tunable circuit 622. A control terminal of the scan transistor Ts2 is coupled to the same scan line SL(n). A second terminal of the storage capacitor C2 is coupled to a constant voltage source Vf2.

In the embodiment of the disclosure, the control terminals of the scan transistors Ts1 and Ts2 receive same scan signal SS(n) from the scan line SL(n). The de-multiplexer transistors Td1 and Td2 receive different control signals CS1 and CS2, so that the de-multiplexer transistors Td1 and Td2 may be turned-on at the different times. Thus, the data signal DS(m) with the corresponding data voltage Vdata is provided to the storage capacitors C1 and C2 respectively. That is, each of the storage capacitors C1 and C2 may receive a corresponding data voltage from the data line DL(m). Thus, the pixel circuit 610 may provide a driving signal with driving voltage V1 to drive the tunable circuit 621 according to the storage capacitor C1, and may provide a driving signal with driving voltage V2 to drive the tunable circuit 622 according to the storage capacitor C2. In other words, since the each two adjacent tunable circuit of the tunable circuits P(1,1) to P(M,N) may share the same scan line, the number of scan lines of the electronic device 100 may be effectively reduced.

In the embodiment of the disclosure, the relevant signals of FIG. 3 may also be applied to the electronic unit 600, therefore the pixel circuit 610 may also split data writing period of the tunable circuits 621 and 622 into two sub-frame periods of one frame period to realize an efficient driving of the tunable circuits 621 and 622 with an interlaced scanning when the tunable circuits 621 and 622 operate independently. Moreover, for the transmitter circuits and the receiver circuits of the beam-steerable bidirectional antenna device, data writing period of each transmitter circuit and receiver circuit is split into two sub-frame periods by the pixel circuit 610 like the tunable circuits 621 and 622 with the interlaced scanning, which contribute a fast beam-steering by separate data writing of the transmitter circuits and the receiver circuits in each sub-frame period for a full-duplex operation of the beam-steerable bidirectional antenna device.

Figure 7:
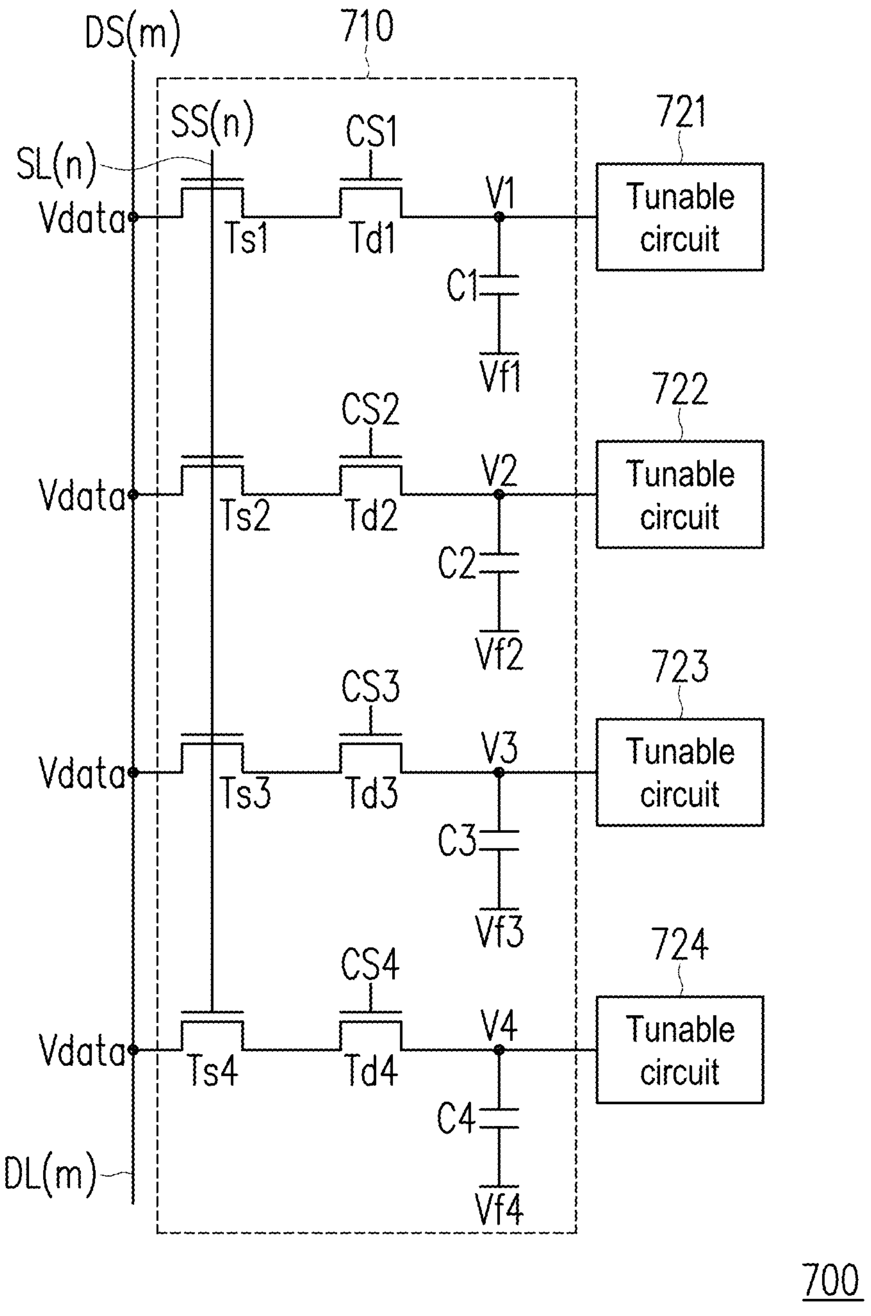
FIG. 7 is a schematic diagram of an electronic unit according to an embodiment of the disclosure.

FIG. 7 is a schematic diagram of an electronic unit according to an embodiment of the disclosure. The following embodiment assumes that the electronic device 100 of FIG. 1 may have M data lines and N/4 scan lines for driving the tunable circuits P(1,1) to P(M,N). Referring to FIG. 7, each of the electronic units of the above embodiment of FIG. 1 may be implemented as the electronic unit 700 of FIG. 7, and each four adjacent tunable circuits may be implemented as four tunable circuits 721 to 724 of FIG. 7. In the embodiment of the disclosure, the electronic unit 700 includes a pixel circuit 710, and the four tunable circuits 721 to 724. The pixel circuit 710 is coupled to the tunable circuits 721 to 724. The pixel circuit 710 includes four scan transistors Ts1 to Ts4, four de-multiplexer transistors Td1 to Td4, and four storage capacitors C1 to C4. In the embodiment of the disclosure, the scan transistors Ts1 to Ts4 and the de-multiplexer transistors Td1 to Td4 are N-type transistors, but the disclosure is not limited thereto. The tunable circuits 721 to 724 may have different tunable characteristics, such as different resonant frequency tunable ranges. In the embodiment of the disclosure, each of the tunable circuits 721 to 724 includes a tunable component. In one embodiment of the disclosure, the tunable component may be a voltage-controlled and capacitance tunable component, such as a varactor diode. Moreover, in one embodiment of disclosure, the tunable circuits 721 to 724 may form transmitter circuits and receiver circuits which have different resonant frequency tunable ranges in beam-steerable bidirectional simultaneous dual-band antenna (eg. a transmitter and a receiver circuit for each Ku-/Ka-band of a satellite communication), operate independently in full-duplex operation with simultaneous dual-band, and include varactor diodes as the voltage-controlled capacitance tunable component to tune resonant frequency of the transmitter and the receiver circuits for each band.

In the embodiment of the disclosure, a first terminal of the scan transistor Ts1 is coupled to a data line DL(m), where m is between 1 to M. A second terminal of the scan transistor Ts1 is coupled to a first terminal of the de-multiplexer transistor Td1. A control terminal of the scan transistor Ts1 is coupled to a scan line SL(n), where n is between 1 to N/4. A second terminal of the de-multiplexer transistor Td1 is coupled to a first terminal of the storage capacitor C1 and the tunable circuit 721. A control terminal of the de-multiplexer transistor Td1 receives a control signal CS1. A second terminal of the storage capacitor C1 is coupled to a constant voltage source Vf1.

In the embodiment of the disclosure, a first terminal of the scan transistor Ts2 is coupled to the same data line DL(m). A second terminal of the scan transistor Ts2 is coupled to a first terminal of the de-multiplexer transistor Td2. A control terminal of the scan transistor Ts2 is coupled to the same scan line SL(n). A second terminal of the de-multiplexer transistor Td2 is coupled to a first terminal of the storage capacitor C2 and the tunable circuit 722. A control terminal of the de-multiplexer transistor Td2 receives a control signal CS2. A second terminal of the storage capacitor C2 is coupled to a constant voltage source Vf2.

In the embodiment of the disclosure, a first terminal of the scan transistor Ts3 is coupled to the same data line DL(m). A second terminal of the scan transistor Ts3 is coupled to a first terminal of the de-multiplexer transistor Td3. A control terminal of the scan transistor Ts3 is coupled to the same scan line SL(n). A second terminal of the de-multiplexer transistor Td3 is coupled to a first terminal of the storage capacitor C3 and the tunable circuit 723. A control terminal of the de-multiplexer transistor Td3 receives a control signal CS3. A second terminal of the storage capacitor C3 is coupled to a constant voltage source Vf3.

In the embodiment of the disclosure, a first terminal of the scan transistor Ts4 is coupled to the same data line DL(m). A second terminal of the scan transistor Ts4 is coupled to a first terminal of the de-multiplexer transistor Td4. A control terminal of the scan transistor Ts4 is coupled to the same scan line SL(n). A second terminal of the de-multiplexer transistor Td4 is coupled to a first terminal of the storage capacitor C4 and the tunable circuit 724. A control terminal of the de-multiplexer transistor Td4 receives a control signal CS4. A second terminal of the storage capacitor C4 is coupled to a constant voltage source Vf4.

In the embodiment of the disclosure, the control terminals of the scan transistors Ts1 to Ts4 receive same scan signal SS(n) from the scan line SL(n), so that the scan transistors Ts1 to Ts4 may be turned-on at the same time to receive same data signal DS(m) with a data voltage Vdata from the data line DL(m). The de-multiplexer transistors Td1 to Td4 receive different control signals CS1 to CS4, so that the de-multiplexer transistors Td1 to Td4 may be turned-on at the different times to respectively provide the data signal DS(m) with the corresponding data voltage Vdata to the storage capacitors C1 to C4. That is, each of the storage capacitors C1 to C4 may receive a corresponding data voltage from the data line DL(m). Thus, the pixel circuit 710 may provide a driving signal with driving voltage V1 to drive the tunable circuit 721 according to the storage capacitor C1, may provide a driving signal with driving voltage V2 to drive the tunable circuit 722 according to the storage capacitor C2, may provide a driving signal with driving voltage V3 to drive the tunable circuit 723 according to the storage capacitor C3, and may provide a driving signal with driving voltage V4 to drive the tunable circuit 724 according to the storage capacitor C4. In other words, since the each four adjacent tunable circuit of the tunable circuits P(1,1) to P(M,N) may share the same scan line, the number of scan lines of the electronic device 100 may be effectively reduced.

Figure 8:
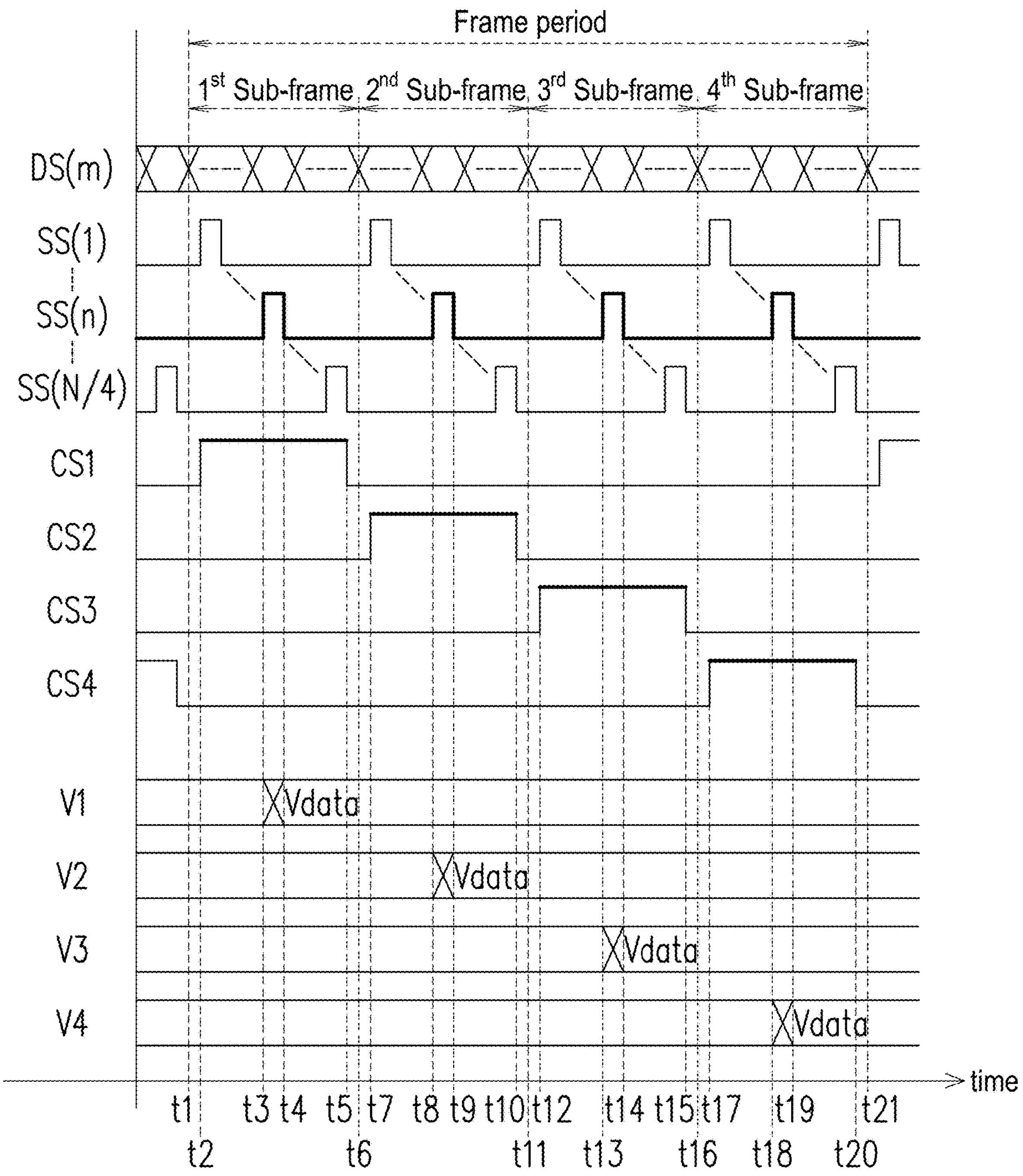
FIG. 8 is a timing diagram of relevant signals according to the embodiment of the FIG. 7.

FIG. 8 is a timing diagram of relevant signals according to the embodiment of the FIG. 7. The following embodiment assumes that the electronic unit 700 may be a (m,n)-th electronic unit, and the N/4 scan lines of the electronic device may provide the scan signals SS(1) to SS(N/4) respectively. As shown in FIG. 8, the electronic unit 700 may receive the data signal DS(m), the scan signal SS(n), the control signals CS1 to CS4. Referring to FIG. 7 and FIG. 8, during one frame period from time t1 to time t21, the pixel circuit 710 may split data writing period of the tunable circuits 721 to 724 into a first sub-frame period from time t1 to time t6, a second sub-frame period from time t6 to time t11, a third sub-frame period from time t11 to time t16, and a fourth sub-frame period from time t16 to time t21.

Specifically, during a period from time t2 to time t5, the control signal CS1 is changed from a low voltage level to a high voltage level, and the control signals CS2 to CS4 are maintained at the low voltage level. Thus, during the period from time t2 to time t5, the de-multiplexer transistor Td1 is turned-on, and the de-multiplexer transistors Td2 to Td4 are turned-off. During a period from time t3 to time t4, the scan signal SS(n) is changed from the low voltage level to the high voltage level, so that the scan transistors Ts1 to Ts4 are turned-on. Thus, during the period from time t3 to time t4, the de-multiplexer transistor Td1 may provide the data signal DS(m) with the corresponding data voltage Vdata to the storage capacitor C1, so that the pixel circuit 710 may provide the driving signal with driving voltage V1 to drive the tunable circuit 721 according to the storage capacitor C1. Furthermore, during the period from time t3 to time t4, the de-multiplexer transistors Td2 to Td4 are turned-off and do not provide the data signal DS(m) to the storage capacitors C2 to C4. Thus, the pixel circuit 710 may continue to provide the driving signal to the tunable circuits 722 to 724 corresponding to driving voltages V2 to V4 stored in the storage capacitors C2 to C4.

During a period from time t7 to time t10, the control signal CS2 is changed from the low voltage level to the high voltage level, and the control signals CS1, CS3, and CS4 are maintained at the low voltage level. Thus, during the period from time t7 to time t10, the de-multiplexer transistor Td2 is turned-on, and the de-multiplexer transistors Td1, Td3, and Td4 are turned-off. During a period from time t8 to time t9, the scan signal SS(n) is changed from the low voltage level to the high voltage level, so that the scan transistors Ts1 to Ts4 are turned-on. Thus, during the period from time t8 to time t9, the de-multiplexer transistor Td2 may provide the data signal DS(m) with the corresponding data voltage Vdata to the storage capacitor C2, so that the pixel circuit 710 may provide the driving signal with driving voltage V2 to drive the tunable circuit 722 according to the storage capacitor C2. Furthermore, during the period from time t8 to time t9, the de-multiplexer transistors Td1, Td3, and Td4 are turned-off and do not provide the data signal DS(m) to the storage capacitors C1, C3 and C4. Thus, the pixel circuit 710 may continue to provide the driving signal to the tunable circuits 721, 723 and 724 corresponding to driving voltages V1, V3, and V4 stored in the storage capacitors C1, C3 and C4.

During a period from time t12 to time t15, the control signal CS3 is changed from the low voltage level to the high voltage level, and the control signals CS1, CS2, and CS4 are maintained at the low voltage level. Thus, during the period from time t12 to time t15, the de-multiplexer transistor Td3 is turned-on, and the de-multiplexer transistors Td1, Td2, and Td4 are turned-off. During a period from time t13 to time t14, the scan signal SS(n) is changed from the low voltage level to the high voltage level, so that the scan transistors Ts1 to Ts4 are turned-on. Thus, during the period from time t13 to time t14, the de-multiplexer transistor Td3 may provide the data signal DS(m) with the corresponding data voltage Vdata to the storage capacitor C3, so that the pixel circuit 710 may provide the driving signal with driving voltage V3 to drive the tunable circuit 723 according to the storage capacitor C3. Furthermore, during the period from time t13 to time t14, the de-multiplexer transistors Td1, Td2 and Td4 are turned-off and do not provide the data signal DS(m) to the storage capacitors C1, C2 and C4. Thus, the pixel circuit 710 may continue to provide the driving signal to the tunable circuits 721, 722 and 724 corresponding to driving voltages V1, V2 and V4 stored in the storage capacitors C1, C2, and C4.

During a period from time t17 to time t20, the control signal CS4 is changed from the low voltage level to the high voltage level, and the control signals CS1 to CS3 are maintained at the low voltage level. Thus, during the period from time t17 to time t20, the de-multiplexer transistor Td4 is turned-on, and the de-multiplexer transistors Td1 to Td3 are turned-off. During a period from time t18 to time t19, the scan signal SS(n) is changed from the low voltage level to the high voltage level, so that the scan transistors Ts1 to Ts4 are turned-on. Thus, during the period from time t18 to time t19, the de-multiplexer transistor Td4 may provide the data signal DS(m) with the corresponding data voltage Vdata to the storage capacitor C4, so that the pixel circuit 710 may provide the driving signal with driving voltage V4 to drive the tunable circuit 724 according to the storage capacitor C4. Furthermore, during the period from time t18 to time t19, the de-multiplexer transistors Td1 to Td3 are turned-off and do not provide the data signal DS(m) to the storage capacitors C1 to C3. Thus, the pixel circuit 710 may continue to provide the driving signal to the tunable circuits 721 to 723 corresponding to driving voltages V1 to V3 stored in the storage capacitors C1 to C3.

In the embodiment of the disclosure, the turn-on periods of the de-multiplexer transistors Td1 to Td4 are non-overlapping. Therefore, the during one frame period, the pixel circuit 710 may split data writing period of the tunable circuits 721 to 724 into four sub-frame periods of one frame period to realize an efficient driving of the tunable circuits 721 to 724 with an interlaced scanning when the tunable circuits 721 to 724 operate independently. Moreover, for the transmitter circuits and the receiver circuits of the beam-steerable bidirectional simultaneous dual-band antenna device, data writing period of each transmitter circuit and receiver circuit for each band is split into four sub-frame periods by the pixel circuit 710 like the tunable circuits 721 to 724 with the interlaced scanning, which contribute a fast beam-steering by separate data writing of the transmitter circuits and the receiver circuits in each sub-frame period for a full-duplex operation for each band of the beam-steerable bidirectional simultaneous dual-band antenna device.

Figure 9:
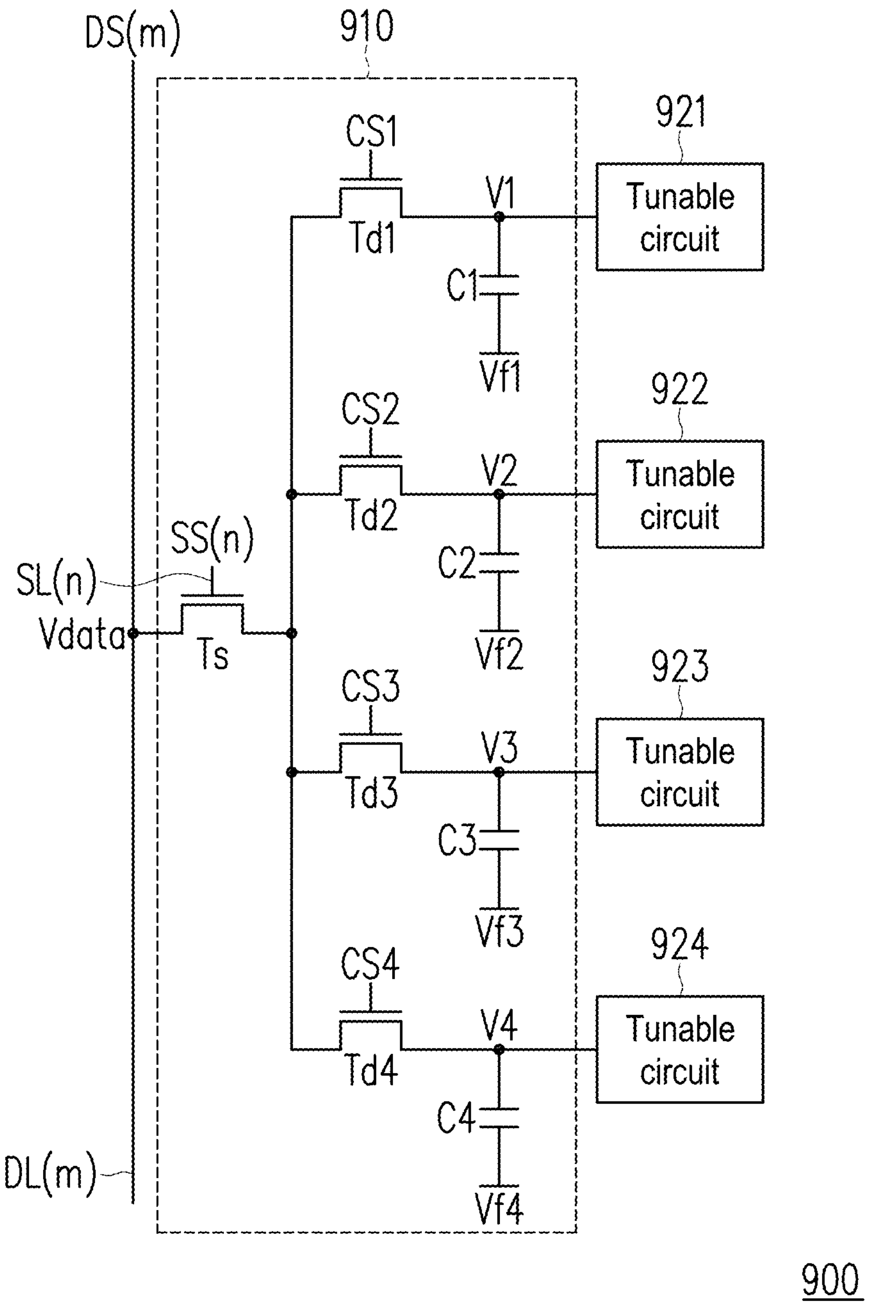
FIG. 9 is a schematic diagram of an electronic unit according to an embodiment of the disclosure.

FIG. 9 is a schematic diagram of an electronic unit according to an embodiment of the disclosure. The following embodiment assumes that the electronic device 100 of FIG. 1 may have M data lines and N/4 scan lines for driving the tunable circuits P(1,1) to P(M,N). Referring to FIG. 9, each of the electronic units of the above embodiment of FIG. 1 may be implemented as the electronic unit 900 of FIG. 9, and each four adjacent tunable circuits may be implemented as four tunable circuits 921 to 924 of FIG. 9. In the embodiment of the disclosure, the electronic unit 900 includes a pixel circuit 910, and the four tunable circuits 921 to 924. The pixel circuit 910 is coupled to the tunable circuits 921 to 924. The pixel circuit 910 includes one scan transistor Ts, four de-multiplexer transistors Td1 to Td4, and four storage capacitors C1 to C4.

In the embodiment of the disclosure, a first terminal of the scan transistor Ts is coupled to a data line DL(m), where m is between 1 to M. A second terminal of the scan transistor Ts1 is coupled to a first terminals of the de-multiplexer transistors Td1 to Td4. A control terminal of the scan transistor Ts1 is coupled to a scan line SL(n), where n is between 1 to N/4. A second terminal of the de-multiplexer transistor Td1 is coupled to a first terminal of the storage capacitor C1 and the tunable circuit 921. A control terminal of the de-multiplexer transistor Td1 receives a control signal CS1. A second terminal of the storage capacitor C1 is coupled to a constant voltage source Vf1.

In the embodiment of the disclosure, a second terminal of the de-multiplexer transistor Td2 is coupled to a first terminal of the storage capacitor C2 and the tunable circuit 922. A control terminal of the de-multiplexer transistor Td2 receives a control signal CS2. A second terminal of the storage capacitor C2 is coupled to a constant voltage source Vf2.

In the embodiment of the disclosure, a second terminal of the de-multiplexer transistor Td3 is coupled to a first terminal of the storage capacitor C3 and the tunable circuit 923. A control terminal of the de-multiplexer transistor Td3 receives a control signal CS3. A second terminal of the storage capacitor C3 is coupled to a constant voltage source Vf3.

In the embodiment of the disclosure, a second terminal of the de-multiplexer transistor Td4 is coupled to a first terminal of the storage capacitor C4 and the tunable circuit 924. A control terminal of the de-multiplexer transistor Td4 receives a control signal CS4. A second terminal of the storage capacitor C4 is coupled to a constant voltage source Vf4.

In the embodiment of the disclosure, the control terminal of the scan transistor Ts receives a signal SS(n) from the scan line SL(n), so that the scan transistor Ts may be turned-on to receive a data signal DS(m) with a data voltage Vdata from the data line DL(m). The de-multiplexer transistors Td1 to Td4 receive different control signals CS1 to CS4, so that the de-multiplexer transistors Td1 to Td4 may be turned-on at the different times to respectively provide the data signal DS(m) with the corresponding data voltage Vdata to the storage capacitors C1 to C4. That is, each of the storage capacitors C1 to C4 may receive a corresponding data voltage from the data line DL(m). Thus, the pixel circuit 910 may provide a driving signal with driving voltage V1 to drive the tunable circuit 921 according to the storage capacitor C1, may provide a driving signal with driving voltage V2 to drive the tunable circuit 922 according to the storage capacitor C2, may provide a driving signal with driving voltage V3 to drive the tunable circuit 923 according to the storage capacitor C3, and may provide a driving signal with driving voltage V4 to drive the tunable circuit 924 according to the storage capacitor C4. In other words, since the each four adjacent tunable circuit of the tunable circuits P(1,1) to P(M,N) may share the same scan line, the number of scan lines of the electronic device 100 may be effectively reduced. Moreover, the since the each of the electronic units of the electronic device 100 may use only one scan transistor, the number of scan transistors of the electronic device 100 may also be effectively reduced.

In the embodiment of the disclosure, the relevant signals of FIG. 8 may also be applied to the electronic unit 900, therefore the pixel circuit 900 may also split data writing period of the tunable circuits 921 to 924 into four sub-frame periods of one frame period to realize an efficient driving of the tunable circuits 921 to 924 with an interlaced scanning when the tunable circuits 921 to 924 operate independently. Moreover, for the transmitter circuits and the receiver circuits of the beam-steerable bidirectional simultaneous dual-band antenna device, data writing period of each transmitter circuit and receiver circuit for each band is split into four sub-frame periods by the pixel circuit 910 like the tunable circuits 921 to 924 with the interlaced scanning, which contribute a fast beam-steering by separate data writing of the transmitter circuits and the receiver circuits in each sub-frame period for a full-duplex operation for each band of the beam-steerable bidirectional simultaneous dual-band antenna device.

Figure 10:
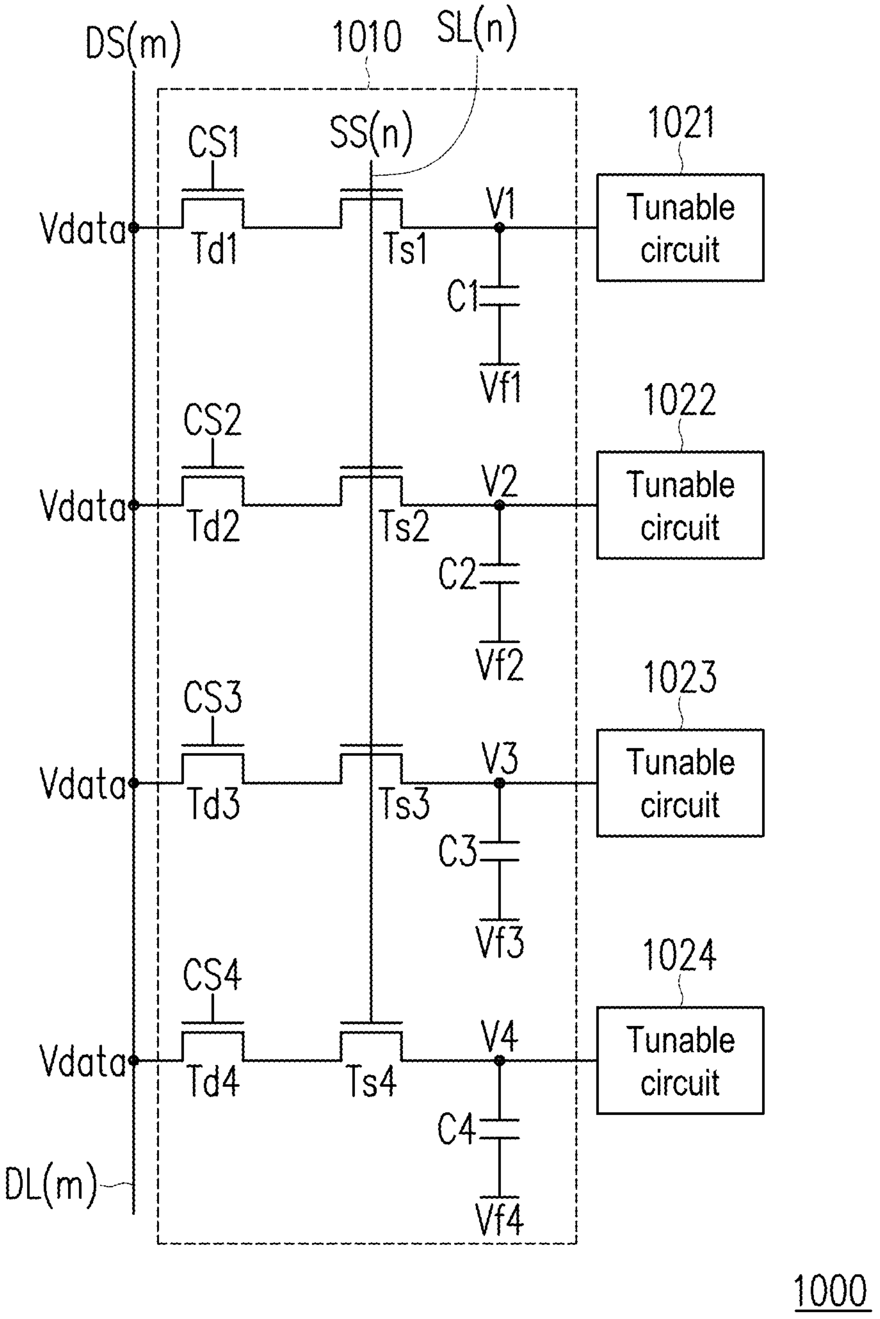
FIG. 10 is a schematic diagram of an electronic unit according to an embodiment of the disclosure.

FIG. 10 is a schematic diagram of an electronic unit according to an embodiment of the disclosure. The following embodiment assumes that the electronic device 100 of FIG. 1 may have M data lines and N/4 scan lines for driving the tunable circuits P(1,1) to P(M,N). Referring to FIG. 10, each of the electronic units of the above embodiment of FIG. 1 may be implemented as the electronic unit 1000 of FIG. 10, and each four adjacent tunable circuits may be implemented as four tunable circuits 1021 to 1024 of FIG. 10. In the embodiment of the disclosure, the electronic unit 1000 includes a pixel circuit 1010, and the four tunable circuits 1021 and 1024. The pixel circuit 1010 is coupled to the tunable circuits 1021 and 1024. The pixel circuit 1010 includes four scan transistors Ts1 to Ts4, four de-multiplexer transistors Td1 to Td4, and four storage capacitors C1 to C4.

In the embodiment of the disclosure, a first terminal of the de-multiplexer transistor Td1 is coupled to a data line DL(m), where m is between 1 to M. A second terminal of the de-multiplexer transistor Td1 is coupled to a first terminal of the scan transistor Ts1. A control terminal of the de-multiplexer transistor Td1 receives a control signal CS1. A second terminal of the scan transistor Ts1 is coupled to a first terminal of the storage capacitor C1 and the tunable circuit 1021. A control terminal of the scan transistor Ts1 is coupled to a scan line SL(n), where n is between 1 to N/4. A second terminal of the storage capacitor C1 is coupled to a constant voltage source Vf1.

In the embodiment of the disclosure, a first terminal of the de-multiplexer transistor Td2 is coupled to the same data line DL(m). A second terminal of the de-multiplexer transistor Td2 is coupled to a first terminal of the scan transistor Ts2. A control terminal of the de-multiplexer transistor Td2 receives a control signal CS2. A second terminal of the scan transistor Ts2 is coupled to a first terminal of the storage capacitor C2 and the tunable circuit 1022. A control terminal of the scan transistor Ts2 is coupled to the same scan line SL(n). A second terminal of the storage capacitor C2 is coupled to a constant voltage source Vf2.

In the embodiment of the disclosure, a first terminal of the de-multiplexer transistor Td3 is coupled to the same data line DL(m). A second terminal of the de-multiplexer transistor Td3 is coupled to a first terminal of the scan transistor Ts3. A control terminal of the de-multiplexer transistor Td3 receives a control signal CS3. A second terminal of the scan transistor Ts3 is coupled to a first terminal of the storage capacitor C3 and the tunable circuit 1023. A control terminal of the scan transistor Ts3 is coupled to the same scan line SL(n). A second terminal of the storage capacitor C3 is coupled to a constant voltage source Vf3.

In the embodiment of the disclosure, a first terminal of the de-multiplexer transistor Td4 is coupled to the same data line DL(m). A second terminal of the de-multiplexer transistor Td4 is coupled to a first terminal of the scan transistor Ts4. A control terminal of the de-multiplexer transistor Td4 receives a control signal CS4. A second terminal of the scan transistor Ts4 is coupled to a first terminal of the storage capacitor C4 and the tunable circuit 1024. A control terminal of the scan transistor Ts4 is coupled to the same scan line SL(n). A second terminal of the storage capacitor C4 is coupled to a constant voltage source Vf4.

In the embodiment of the disclosure, the control terminals of the scan transistors Ts1 to Ts4 receive same scan signal SS(n) from the scan line SL(n). The de-multiplexer transistors Td1 to Td4 receive different control signals CS1 to CS4, so that the de-multiplexer transistors Td1 to Td4 may be turned-on at the different times to respectively provide the data signal DS(m) with the corresponding data voltage Vdata to the storage capacitors C1 to C4 through the scan transistors Ts1 to Ts4. That is, each of the storage capacitors C1 to C4 may receive a corresponding data voltage from the data line DL(m). Thus, the pixel circuit 1010 may provide a driving signal with driving voltage V1 to drive the tunable circuit 1021 according to the storage capacitor C1, may provide a driving signal with driving voltage V2 to drive the tunable circuit 1022 according to the storage capacitor C2, may provide a driving signal with driving voltage V3 to drive the tunable circuit 1023 according to the storage capacitor C3, and may provide a driving signal with driving voltage V4 to drive the tunable circuit 1024 according to the storage capacitor C4. In other words, since the each four adjacent tunable circuit of the tunable circuits P(1,1) to P(M,N) may share the same scan line, the number of scan lines of the electronic device 100 may be effectively reduced.

In the embodiment of the disclosure, the relevant signals of FIG. 8 may also be applied to the electronic unit 1000, therefore the pixel circuit 1000 may also split data writing period of the tunable circuits 1021 to 1022 into four sub-frame periods of one frame period to realize an efficient driving of the tunable circuits 1021 to 1024 with an interlaced scanning when the tunable circuits 1021 to 1024 operate independently. Moreover, for the transmitter circuits and the receiver circuits of the beam-steerable bidirectional simultaneous dual-band antenna device, data writing period of each transmitter circuit and receiver circuit for each band is split into four sub-frame periods by the pixel circuit 1010 like the tunable circuits 1021 to 1024 with the interlaced scanning, which contribute a fast beam-steering by separate data writing of the transmitter circuits and the receiver circuits in each sub-frame period for a full-duplex operation for each band of the beam-steerable bidirectional simultaneous dual-band antenna device.

Figure 11:
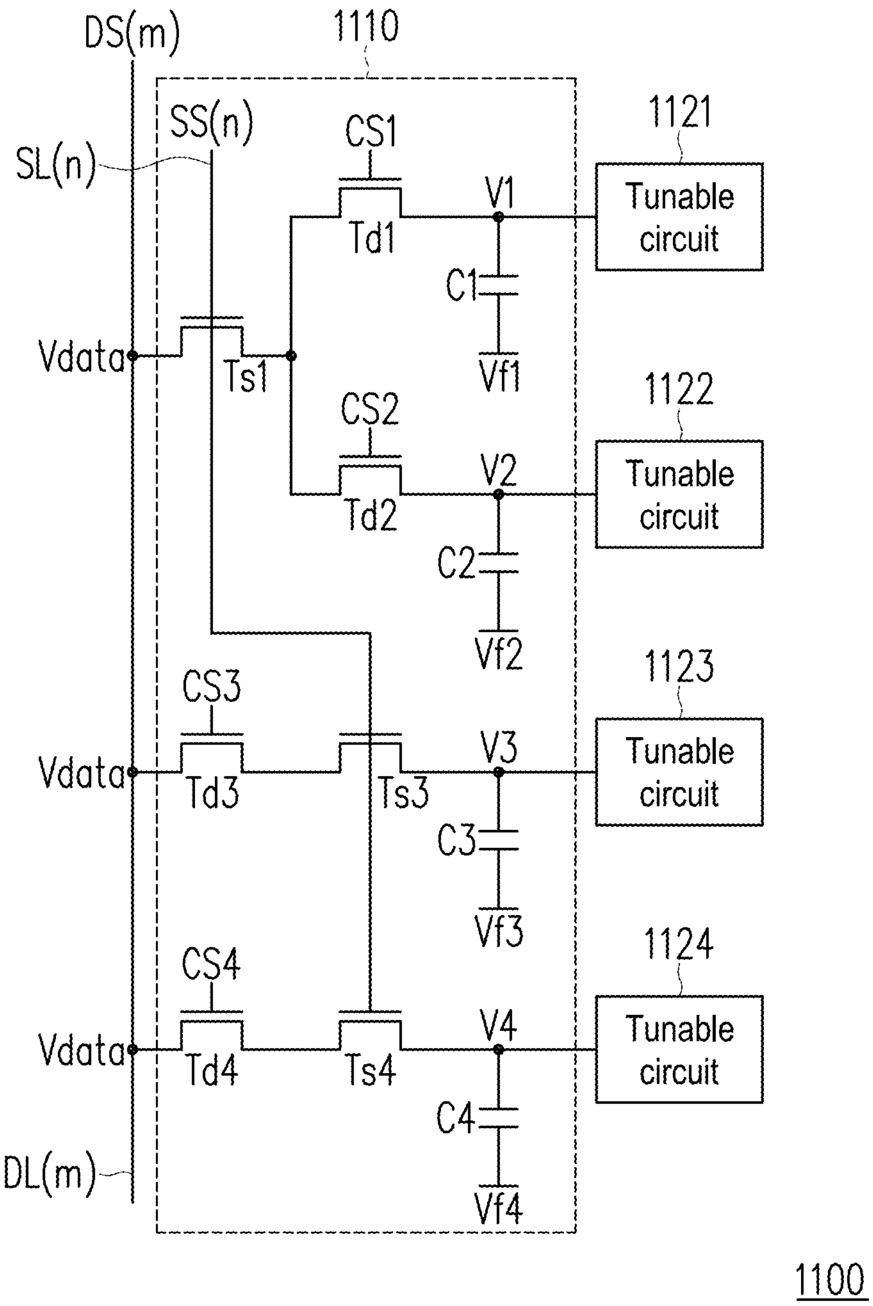
FIG. 11 is a schematic diagram of an electronic unit according to an embodiment of the disclosure.

FIG. 11 is a schematic diagram of an electronic unit according to an embodiment of the disclosure. The following embodiment assumes that the electronic device 100 of FIG. 1 may have M data lines and N/4 scan lines for driving the tunable circuits P(1,1) to P(M,N). Referring to FIG. 11, each of the electronic units of the above embodiment of FIG. 1 may be implemented as the electronic unit 1100 of FIG. 11, and each four adjacent tunable circuits may be implemented as four tunable circuits 1121 to 1124 of FIG. 11. In the embodiment of the disclosure, the electronic unit 1100 includes a pixel circuit 1110, and the four tunable circuits 1121 to 1124. The pixel circuit 1110 is coupled to the tunable circuits 1121 to 1124. The pixel circuit 1110 includes three scan transistors Ts1, Ts4 and Ts4, four de-multiplexer transistors Td1 to Td4, and four storage capacitors C1 to C4.

In the embodiment of the disclosure, a first terminal of the scan transistor Ts1 is coupled to a data line DL(m), where m is between 1 to M. A second terminal of the scan transistor Ts1 is coupled to a first terminals of the de-multiplexer transistors Td1 and Td2. A control terminal of the scan transistor Ts1 is coupled to a scan line SL(n), where n is between 1 to N/4. A second terminal of the de-multiplexer transistor Td1 is coupled to a first terminal of the storage capacitor C1 and the tunable circuit 1121. A control terminal of the de-multiplexer transistor Td1 receives a control signal CS1. A second terminal of the storage capacitor C1 is coupled to a constant voltage source Vf1.

In the embodiment of the disclosure, a second terminal of the de-multiplexer transistor Td2 is coupled to a first terminal of the storage capacitor C2 and the tunable circuit 1122. A control terminal of the de-multiplexer transistor Td2 receives a control signal CS2. A second terminal of the storage capacitor C2 is coupled to a constant voltage source Vf2.

In the embodiment of the disclosure, a first terminal of the de-multiplexer transistor Td3 is coupled to the same data line DL(m). A second terminal of the de-multiplexer transistor Td3 is coupled to a first terminal of the scan transistor Ts3. A control terminal of the de-multiplexer transistor Td3 receives a control signal CS3. A second terminal of the scan transistor Ts3 is coupled to a first terminal of the storage capacitor C3 and the tunable circuit 1123. A control terminal of the scan transistor Ts3 is coupled to the same scan line SL(n). A second terminal of the storage capacitor C3 is coupled to a constant voltage source Vf3.

In the embodiment of the disclosure, a first terminal of the de-multiplexer transistor Td4 is coupled to the same data line DL(m). A second terminal of the de-multiplexer transistor Td4 is coupled to a first terminal of the scan transistor Ts4. A control terminal of the de-multiplexer transistor Td4 receives a control signal CS4. A second terminal of the scan transistor Ts4 is coupled to a first terminal of the storage capacitor C4 and the tunable circuit 1124. A control terminal of the scan transistor Ts4 is coupled to the same scan line SL(n). A second terminal of the storage capacitor C4 is coupled to a constant voltage source Vf4.

In the embodiment of the disclosure, the control terminals of the scan transistors Ts1, Ts3 and Ts4 receive same scan signal SS(n) from the scan line SL(n). The de-multiplexer transistors Td1 to Td4 receive different control signals CS1 to CS4, so that the de-multiplexer transistors Td1 to Td4 may be turned-on at the different times. Thus, the data signal DS(m) with the corresponding data voltage Vdata is provided to the storage capacitors C1 to C4 respectively. That is, each of the storage capacitors C1 to C4 may receive a corresponding data voltage from the data line DL(m). Thus, the pixel circuit 1110 may provide a driving signal with driving voltage V1 to drive the tunable circuit 1121 according to the storage capacitor C1, may provide a driving signal with driving voltage V2 to drive the tunable circuit 1122 according to the storage capacitor C2, may provide a driving signal with driving voltage V3 to drive the tunable circuit 1123 according to the storage capacitor C3, and may provide a driving signal with driving voltage V4 to drive the tunable circuit 1124 according to the storage capacitor C4. In other words, since the each two adjacent tunable circuit of the tunable circuits P(1,1) to P(M,N) may share the same scan line, the number of scan lines of the electronic device 100 may be effectively reduced. Moreover, the since the each of the electronic units of the electronic device 100 may use fewer scan transistors, the number of scan transistors of the electronic device 100 may also be effectively reduced.

In the embodiment of the disclosure, the relevant signals of FIG. 8 may also be applied to the electronic unit 1100, therefore the pixel circuit 1110 may also split data writing period of the tunable circuits 1121 to 1124 into four sub-frame periods of one frame period to realize an efficient driving of the tunable circuits 1121 and 1124 with an interlaced scanning when the tunable circuits 1121 to 1124 operate independently. Moreover, for the transmitter circuits and the receiver circuits of the beam-steerable bidirectional simultaneous dual-band antenna device, data writing period of each transmitter circuit and receiver circuit for each band is split into four sub-frame periods by the pixel circuit 1010 like the tunable circuits 1021 to 1024 with the interlaced scanning, which contribute a fast beam-steering by separate data writing of the transmitter circuits and the receiver circuits in each sub-frame period for a full-duplex operation for each band of the beam-steerable bidirectional simultaneous dual-band antenna device.

It should be noted that, the number and the placement positions of the scan transistors and the de-multiplexer transistors in the above embodiments may be arbitrarily changed according to the relevant design concepts of the present disclosure and are not limited to those shown in the drawings.

Figure 12:
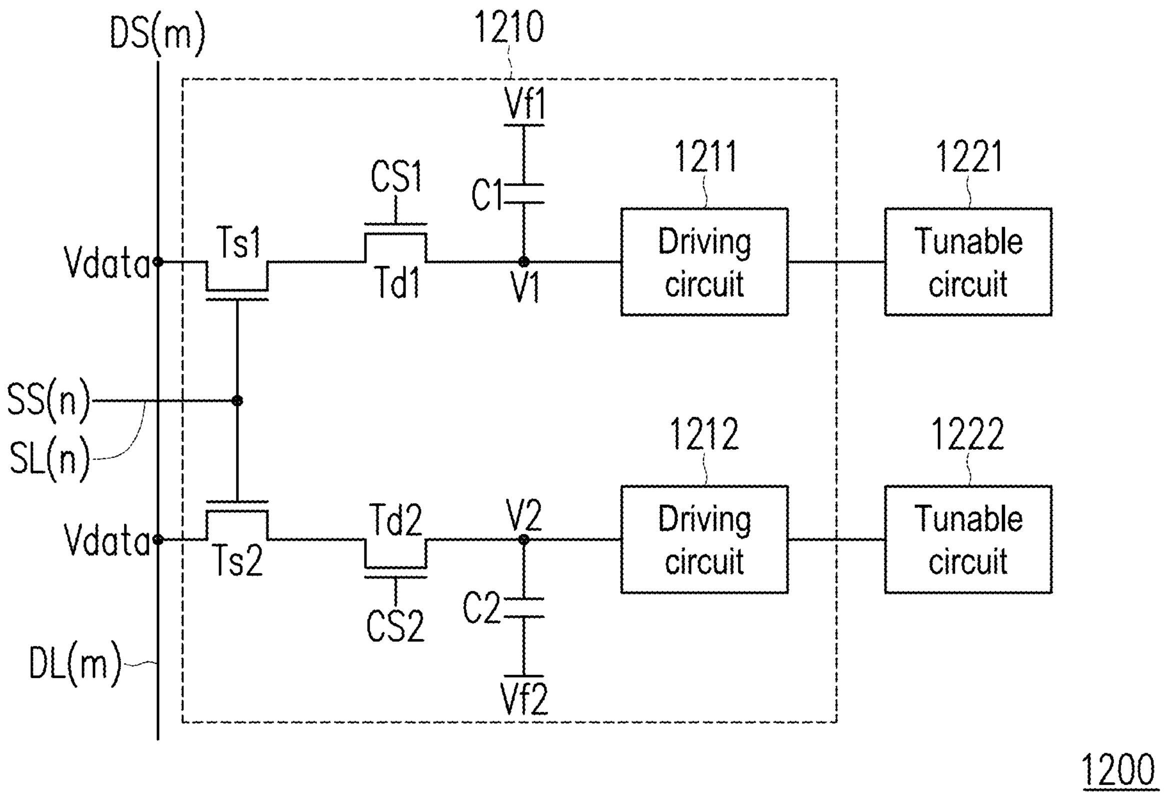
FIG. 12 is a schematic diagram of an electronic unit according to an embodiment of the disclosure.

FIG. 12 is a schematic diagram of an electronic unit according to an embodiment of the disclosure. The following embodiment assumes that the electronic device 100 of FIG. 1 may have M data lines and N/2 scan lines for driving the tunable circuits P(1,1) to P(M,N). Referring to FIG. 12, each of the electronic units of the above embodiment of FIG. 1 may be implemented as the electronic unit 1200 of FIG. 12, and each two adjacent tunable circuits may be implemented as two tunable circuits 1221 and 1222 of FIG. 12. In the embodiment of the disclosure, the electronic unit 1200 includes a pixel circuit 1210, and the two tunable circuits 1221 and 1222. The pixel circuit 1210 is coupled to the tunable circuits 1221 and 1222. The pixel circuit 1210 includes two scan transistors Ts1 and Ts2, two de-multiplexer transistors Td1 and Td2, two storage capacitors C1 and C2, and two driving circuits 1211 and 1212. In the embodiment of the disclosure, the scan transistors Ts1, Ts2 and the de-multiplexer transistors Td1, Td2 are N-type transistors, but the disclosure is not limited thereto.

In the embodiment of the disclosure, a first terminal of the scan transistor Ts1 is coupled to a data line DL(m), where m is between 1 to M. A second terminal of the scan transistor Ts1 is coupled to a first terminal of the de-multiplexer transistor Td1. A control terminal of the scan transistor Ts1 is coupled to a scan line SL(n), where n is between 1 to N/2. A second terminal of the de-multiplexer transistor Td1 is coupled to a first terminal of the storage capacitor C1 and the driving circuit 1211. The driving circuit 1211 is coupled between the storage capacitor C1 and the tunable circuit 1221, and configured to respectively provide the driving signal corresponding to a data voltage stored in the storage capacitor C1 to the tunable circuit 1221. A control terminal of the de-multiplexer transistor Td1 receives a control signal CS1. A second terminal of the storage capacitor C1 is coupled to a constant voltage source Vf1.

In the embodiment of the disclosure, a first terminal of the scan transistor Ts2 is coupled to the same data line DL(m). A second terminal of the scan transistor Ts2 is coupled to a first terminal of the de-multiplexer transistor Td2. A control terminal of the scan transistor Ts2 is coupled to the same scan line SL(n). A second terminal of the de-multiplexer transistor Td2 is coupled to a first terminal of the storage capacitor C2 and the driving circuit 1212. The driving circuit 1212 is coupled between the storage capacitor C2 and the tunable circuit 1222, and configured to respectively provide the driving signal corresponding to a data voltage stored in the storage capacitor C2 to the tunable circuit 1222. A control terminal of the de-multiplexer transistor Td2 receives a control signal CS2. A second terminal of the storage capacitor C2 is coupled to a constant voltage source Vf2.

Different from the embodiment of FIG. 2, the pixel circuit 1210 further includes the driving circuits 1211 and 1212 to enhance driving capability. In one embodiment of the disclosure, the driving circuits 1211 and 1212 may be further configured to convert multiple driving voltages into multiple driving currents to control the tunable circuits 1221 and 1222 with current instead of voltage.

In addition, in other embodiments of the disclosure, the pixel circuits of the above embodiments of FIG. 4 to FIG. 7, and FIG. 9 to FIG. 11 may also be designed to further include a plurality of driving circuits respectively.

Figure 13:
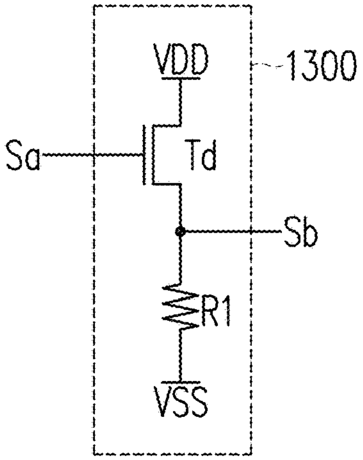
FIG. 13 is a schematic diagram of a driving circuit according to an embodiment of the disclosure.

FIG. 13 is a schematic diagram of a driving circuit according to an embodiment of the disclosure Referring to FIG. 13, the driving circuit of the above embodiments may be implemented as the driving circuit 1300. In the embodiments of the disclosure, the driving circuit 1300 includes a driving transistor Td and a resistor R1. A first terminal of the driving transistor Td is coupled to a first operation voltage VDD. A second terminal of the driving transistor Td is coupled to a first terminal of the resistor R1. A control terminal of the driving transistor Td receives a driving signal Sa with a driving voltage provided by the corresponding capacitor (e.g. the storage capacitor C1 or the storage capacitor C2 in FIG. 12). A second terminal of the resistor R2 is coupled to a second operation voltage VSS. In the embodiment of the disclosure, the driving transistor Td may be a N-type transistor. The first operation voltage VDD may be higher than the second operation voltage VSS. In the embodiment of the disclosure, the driving transistor Td may be operated as a source follower amplifier to convert the driving signal Sa to a driving signal Sb with another driving voltage (i.e. enhance driving capability) for driving the corresponding tunable circuit (e.g. the tunable circuit 1221 or the tunable circuit 1222 in FIG. 12).

Figure 14:
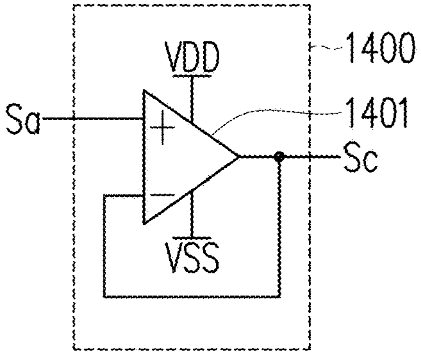
FIG. 14 is a schematic diagram of a driving circuit according to an embodiment of the disclosure.

FIG. 14 is a schematic diagram of a driving circuit according to an embodiment of the disclosure. Referring to FIG. 14, the driving circuit of the above embodiments may be implemented as the driving circuit 1400. In the embodiments of the disclosure, the driving circuit 1400 includes an operational amplifier 1401. A non-inverting input terminal of the operational amplifier 1401 may receive a driving signal Sa with a driving voltage provided by the corresponding capacitor (e.g. the storage capacitor C1 or the storage capacitor C2 in FIG. 12). An inverting input terminal of the operational amplifier 1401 is coupled to an output terminal of operational amplifier 1401. The operational amplifier 1401 is further coupled to a first operation voltage VDD and a second operation voltage VSS. In the embodiment of the disclosure, the operational amplifier 1401 is configured as a voltage amplifier, and configured to convert the driving signal Sa to a driving signal Sc with another driving voltage (i.e. enhance driving capability) for driving the corresponding tunable circuit (e.g. the tunable circuit 1221 or the tunable circuit 1222 in FIG. 12).

Figure 15:
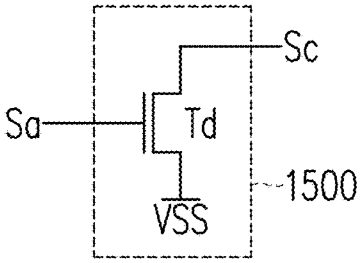
FIG. 15 is a schematic diagram of a driving circuit according to an embodiment of the disclosure.

FIG. 15 is a schematic diagram of a driving circuit according to an embodiment of the disclosure. Referring to FIG. 15, the driving circuit of the above embodiments may be implemented as the driving circuit 1500. In the embodiments of the disclosure, the driving circuit 1500 includes a driving transistor Td. A first terminal of the driving transistor Td is coupled to the corresponding tunable circuit (e.g. the tunable circuit 1221 or the tunable circuit 1222 in FIG. 12). A second terminal of the driving transistor Td is coupled to a second operation voltage VSS. A control terminal of the driving transistor Td receives a driving signal Sa with a driving voltage provided by the corresponding capacitor (e.g. the storage capacitor C1 or the storage capacitor C2 in FIG. 12). In the embodiment of the disclosure, the driving transistor Td may be a N-type transistor. The driving transistor Td may be operated as a current driver to convert the driving signal Sa to a driving signal Sc with driving current for driving the corresponding tunable circuit.

In summary, the electronic device of the disclosure may effectively drive multiple tunable circuits through the interlaced scan. Moreover, the electronic device of the disclosure may use fewer scan lines and fewer scan transistors to effectively reduce the circuit layout area and device volume.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a plurality of electronic units, wherein each of the plurality of electronic units comprises:

a pixel circuit; and a plurality of tunable circuits, coupled to the pixel circuit, wherein the pixel circuit comprises:

at least one scan transistor;

a plurality of de-multiplexer transistors, coupled to the at least one scan transistor; and a plurality of storage capacitors, coupled to a data line through the at least one scan transistor and the plurality of de-multiplexer transistors.

2. The electronic device according to claim 1, wherein the pixel circuit comprises a plurality of scan transistors, and the plurality of scan transistors receive same scan signal.

3. The electronic device according to claim 1, wherein at least a portion of the plurality of de-multiplexer transistors receive different control signals.

4. The electronic device according to claim 3, wherein the turn-on periods of the plurality of de-multiplexer transistors are non-overlapping.

5. The electronic device according to claim 4, wherein signal waveforms of the different control signals are complementary.

6. The electronic device according to claim 1, wherein the at least one scan transistor is coupled between the data line and the plurality of de-multiplexer transistors.

7. The electronic device according to claim 6, wherein the pixel circuit comprises one scan transistor.

8. The electronic device according to claim 1, wherein the plurality of de-multiplexer transistors are coupled between the data line and the at least one scan transistor.

9. The electronic device according to claim 1, wherein each of the plurality of storage capacitors receive a corresponding data voltage from the data line.

10. The electronic device according to claim 9, wherein the pixel circuit provides a driving signal corresponding to the data voltage to each of the plurality of tunable circuits.

11. The electronic device according to claim 10, wherein the pixel circuit further comprises:

a plurality of driving circuit, coupled between the plurality of storage capacitors and the plurality of tunable circuits, and configured to respectively provide the driving signal corresponding to the data voltage to each of the plurality of tunable circuits.

12. The electronic device according to claim 10, wherein the plurality of driving circuits is a plurality of voltage amplifiers.

13. The electronic device according to claim 1, wherein the plurality of tunable circuits has different tunable characteristics.

14. The electronic device according to claim 13, wherein the plurality of tunable circuits have different resonant frequency tunable ranges.

15. The electronic device according to claim 1, wherein each of the plurality of tunable circuits comprises a tunable component.

16. The electronic device according to claim 15, wherein the tunable component is a voltage-controlled component.

17. The electronic device according to claim 15, wherein the tunable component is a capacitance tunable component.

18. The electronic device according to claim 15, wherein the tunable component is a varactor diode.

19. The electronic device according to claim 1, wherein the electronic device is a beam-steerable bidirectional antenna device.

20. The electronic device according to claim 19, wherein the plurality of tunable circuits comprises a transmitter circuit and a receiver circuit of beam-steerable bidirectional antenna device.

* * * * *